United States Patent

Gehrke et al.

[11] Patent Number: 5,874,155
[45] Date of Patent: Feb. 23, 1999

[54] EASY-OPENING FLEXIBLE PACKAGING LAMINATES AND PACKAGING MATERIALS MADE THEREFROM

[75] Inventors: Russell P. Gehrke; Joseph C. Hsu; David J. Haas, all of Neenah; Jay D. Hodson, Greenville, all of Wis.

[73] Assignee: American National Can Company, Chicago, Ill.

[21] Appl. No.: 590,410

[22] Filed: Jan. 25, 1996

Related U.S. Application Data

[63] Continuation-in-part of Ser. No. 475,016, Jun. 7, 1995, abandoned.

[51] Int. Cl.⁶ .............................. B32B 3/10; B32B 27/00
[52] U.S. Cl. .................... 428/134; 428/35.3; 428/35.4; 428/137; 428/195; 428/200; 428/461; 428/476.1; 428/516; 428/518; 383/200
[58] Field of Search .................... 428/34.3, 35.2, 428/35.5, 43, 475.5, 475.8, 476.1, 483, 516, 518, 35.3, 457, 461, 195, 200, 156, 172

[56] References Cited

U.S. PATENT DOCUMENTS

| | | | |
|---|---|---|---|
| 4,360,556 | 11/1982 | Asakura et al. | 428/34.3 |
| 4,407,873 | 10/1983 | Christensen et al. | 428/35.4 |
| 4,565,739 | 1/1986 | Clauson et al. | 428/35.4 |
| 4,778,058 | 10/1988 | Yamazaki et al. | |
| 4,881,649 | 11/1989 | Hsu et al. | |
| 5,169,696 | 12/1992 | Lang et al. | 428/35.4 |
| 5,312,659 | 5/1994 | Otsuka et al. | 428/35.2 |
| 5,487,940 | 1/1996 | Bianchini et al. | 428/35.4 |
| 5,512,337 | 4/1996 | Littmann et al. | 428/35.4 |
| 5,549,944 | 8/1996 | Abate | 428/35.2 |
| 5,556,674 | 9/1996 | Meilhon | 428/35.2 |

FOREIGN PATENT DOCUMENTS

| | | |
|---|---|---|
| 0 450 247 A2 | 10/1991 | European Pat. Off. |
| 0 673 756 A1 | 9/1995 | European Pat. Off. |
| 2 574 051 A | 6/1986 | France |
| 07165256 | 6/1995 | Japan |
| 08072925 | 3/1996 | Japan |

*Primary Examiner*—Rena L. Dye
*Attorney, Agent, or Firm*—McDermott, Will & Emery

[57] ABSTRACT

A polymeric laminate for use in polymeric films, and packaging material and packages made therefrom, that is roughened or knurled to produce a series of nicks or cuts over substantially the entire surface area of the laminate, producing an easy-opening feature. The laminate may be a multilayer, polymeric structure that may comprise an oriented polypropylene, polyethylene terephthalate, or a biaxially oriented nylon. The packaging material of the invention may contain a sealant film, either a single layer or multilayer film, and may also comprise an intermediate layer of foil.

4 Claims, 4 Drawing Sheets

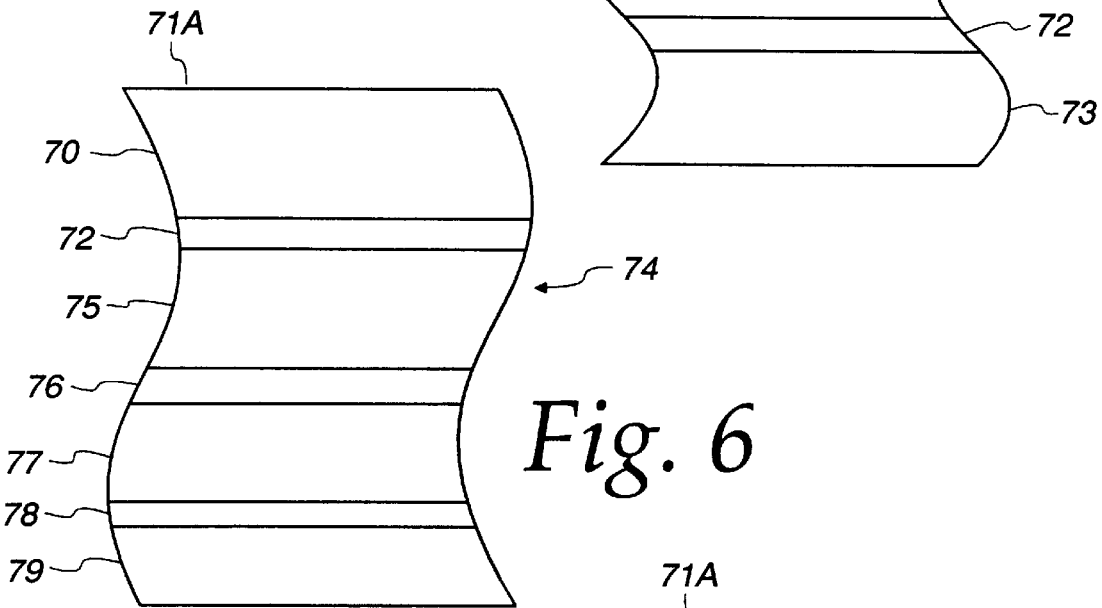
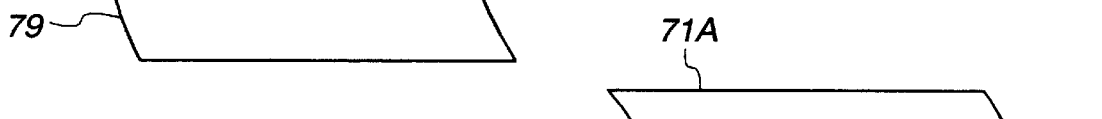
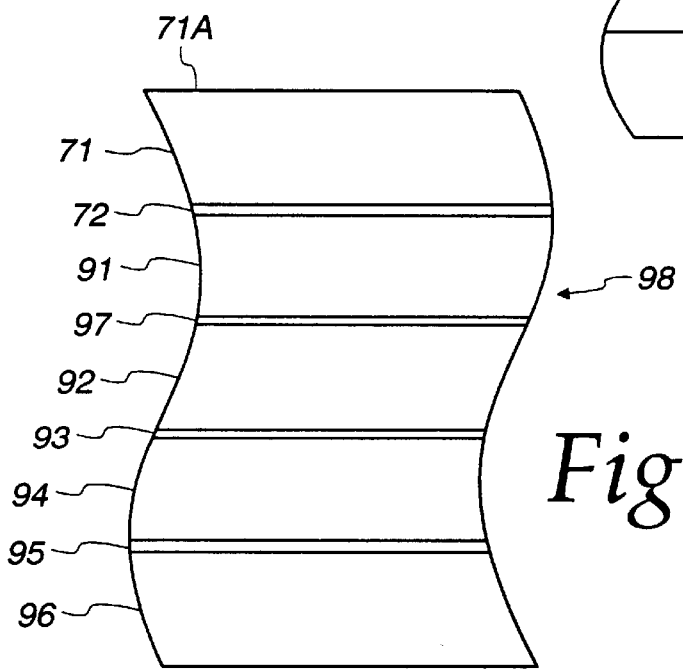

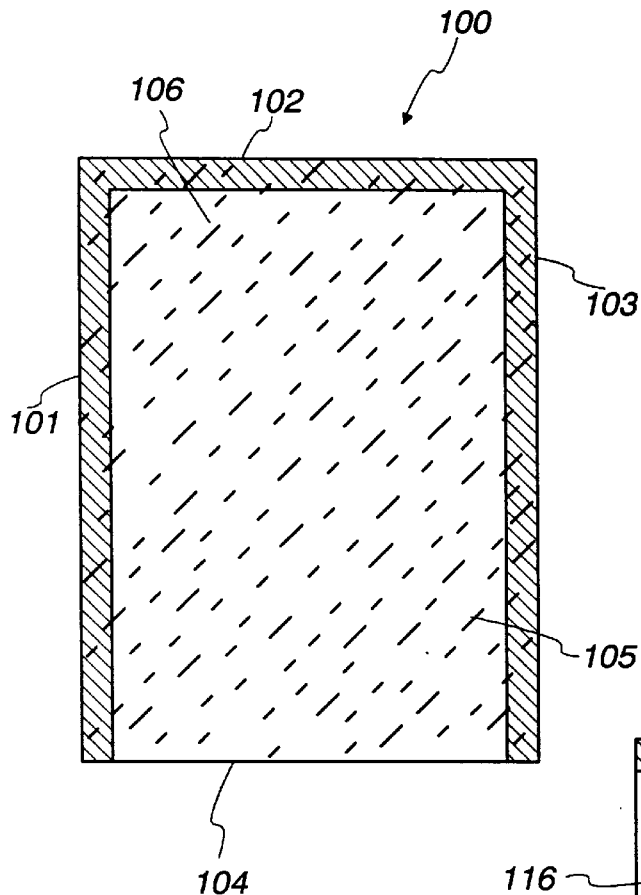
Fig. 9
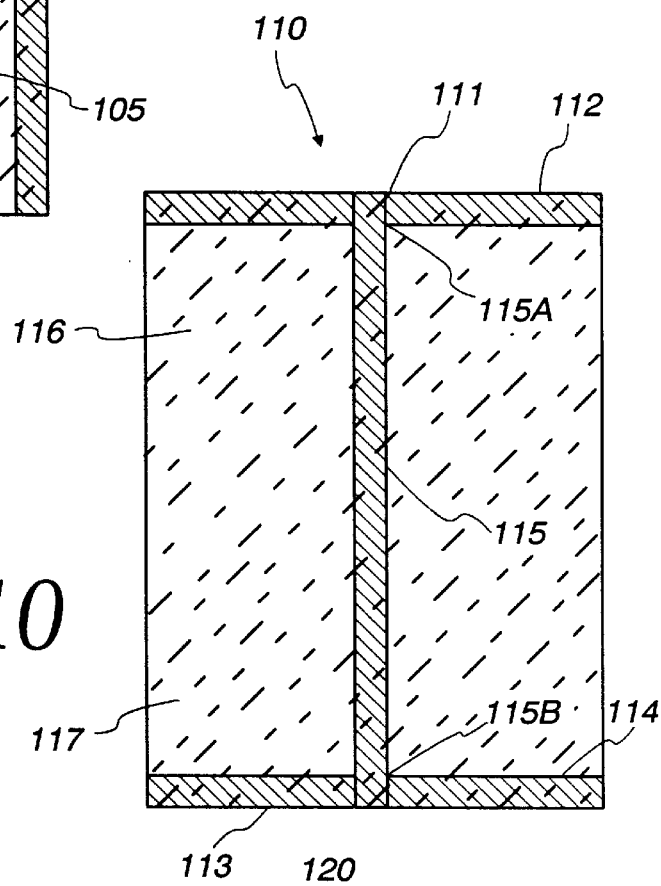
Fig. 10
Fig. 11
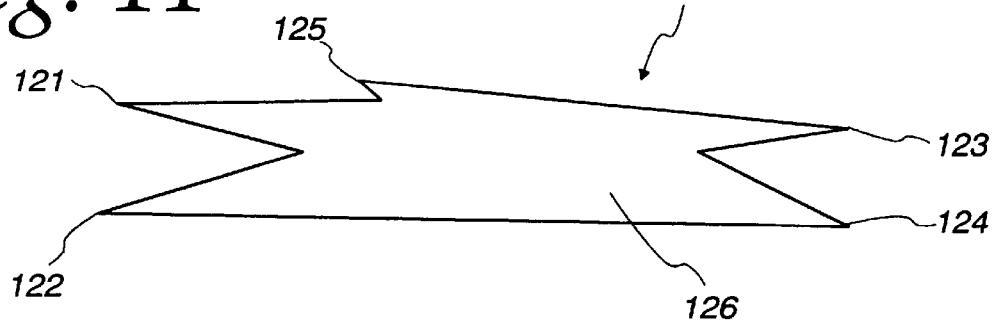

EASY-OPENING FLEXIBLE PACKAGING LAMINATES AND PACKAGING MATERIALS MADE THEREFROM

This application in a continuation-in-part of prior application Ser. No. 08/475,016, filed on Jun. 7, 1995, now abandoned, which is hereby incorporated by reference.

BACKGROUND OF THE INVENTION

This invention relates to the field of polymeric films, and packages made therefrom, for packaging a variety of products, particularly food. More particularly, the invention relates to a method of achieving an easy-opening package made from a polymeric film.

Generally, polymeric or thermoplastic materials are difficult to tear because the materials are flexible and are usually comprised of randomly dispersed, long chains of molecules having relatively strong covalent carbon-to-carbon bonds.

One method of easing tearing is generally to stretch or orient the thermoplastic materials as they are being cast or blown. Stretching lines up the molecular chains in the stretched direction so that if tearing occurs in that direction, it takes place through weaker non-carbon-to-carbon bonds. This method has limited effectiveness because not all polymers can be readily oriented. Also, only a certain amount of molecules can be aligned, and, despite the stretching, tearing may still not be easy and reliable. Orienting also requires special manufacturing efforts and care.

A more effective method of creating an easy-opening tear is to notch the seal of the package to initiate the tear. Notches may be created on the seal during the sealing operations by use of a seal jaw. Alternatively, notches may be created in the bag, at seal or otherwise, by use of a blade or another sharp device, during manufacture or packaging.

A significant problem with bags or films having a notch is that the notch is not precisely located or is disturbed during manufacture, packaging, transportation or general handling.

Another method of forming a tear line, widely used for single layer films, is to employ a star wheel to form a line of intermittent perforations in the films. Perforations are unsuitable for multilayer laminates for many reasons. One such reason is that perforations in the film allow product-environment exchanges which defeat a purpose of using multilayer films, i.e., to protect an interiorly contained product by combining gas barrier properties of one material with moisture barrier properties of another.

A third prior art method of imparting an easy tear opening to a laminate structure is the use of a tear tape or string. The tear tape or string is undesirable because it can result in structures being opened when the tear tape or string is ripped or otherwise disturbed during manufacture, packaging, transportation or handling.

A fourth prior art method of imparting an easy tear opening to a laminate structure is through the use of laser scoring. Laser scoring, however, requires the use of specialized equipment, and therefore, leads to increased costs of manufacture.

An alternative to the above four methods of producing an easy-opening effect is to "roughen," "knurl" or "knick" a designated area of film to create the easy-opening effect.

"Roughening or "knurling" the surface of a polymeric film may be done by various methods. The roughening can be formed by rotating a round abrasive such as a grindstone or wire brush, or other instrument having bristles, and putting the rotating instrument into contact with the film. Alternatively, a flat instrument having a roughened or grainy surface, such as for example a grain-containing sheet material, can be put into contact with the polymeric film.

The following patents and or publications, which teach easy-opening features of the type discussed above, are cited as references:

U.S. Pat. No. 2,703,764, to Vogt, discloses a thermoplastic tape with a weakened embrittled edge to facilitate tearing along the edge.

U.S. Pat. No. 3,608,815, to Bunch, teaches a pattern of porelike punctures over a fold line on the edge of a formed package.

U.S. Pat. No. 4,543,279, to Kai, teaches a film with an easy-opening feature of a plurality of random cuts or scratches formed along the edges of a film.

U.S. Pat. No. 5,141,795, also to Kai, teaches a pouch or package with an easy-opening feature of a multiplicity of through cuts formed in the edge portion of the package, wherein the through cuts are partly or wholly closed with the heat seal layer.

U.S. Pat. No. 4,778,058, to Yamazaki, teaches an easy-opening feature of a surface roughened portion of a film or pouch, wherein the surface roughened portion is positioned at and around the folded portion and at an external surface of the pouch.

European Patent Application No. 0 596 747 A1 teaches an easy-opening feature of a plurality of rows of linearly extending, laterally spaced slits formed parallel to and inwardly adjacent a side of the film.

It has now been found that an effective and practical method of creating an easy-opening package made of polymeric or flexible materials is to roughen or knurl the entire surface of the structure by applying a series of overall nicks or minute cuts over substantially the entire area of the outer layer of the structure.

The method of the invention creates an effective easy-opening package that has decreased costs of production over prior art methods. Since the entire surface area of the package is roughened or knurled, the easy-opening feature does not need to be registered to printing, or to the shape or structure of the final package, resulting in manufacturing efficiencies. This contrasts with prior art packages having easy-opening features, in which the easy opening feature is fixed in a particular location with relation to the printing or to the shape or structure of the finished package.

The method of the invention also creates a packaging material or package that does not have notches or tear strips but is rather a smooth surface. Thus, the laminate and packaging material of the invention avoid the problem of tearing or ripping during manufacture, packaging, transportation or general handling, that is common in the prior art.

SUMMARY OF THE INVENTION

This invention covers a method of achieving easy-opening, flexible packaging laminates and packaging material, and easy-opening packages made therefrom.

The method of the invention has advantages over the prior art because it allows for producing an easy-opening package that does not have tear strips or other notches that may lead to problems during manufacture, packaging, transportation and general handling.

The method of the invention also has advantages over the prior art because it is more easily processed than prior art easy-opening features. The method of the invention does not require the location of the easy-opening feature at a particular point or location on the surface of a film.

The easy-opening packages of the invention are obtained by roughening or knurling the entire surface of the packaging material of the invention. The surface roughening is achieved by the application of a series of small nicks or minute cuts in a film or laminate, which is then used as an outer layer of the package. The nicks or cuts are located over substantially the entire area of the film or laminate. These nicks create an easy-opening tear feature that does not need to be fixed or located in a particular position on the surface of the laminate or packaging material.

The nicks or cuts may be disposed over substantially the entire area of the film or laminate in a pattern, or alternatively, may be randomly dispersed. However, the nicks must be generally located over substantially the entire area of the surface of the film or laminate.

The film or laminate of the invention may be comprised of a variety of polymers or copolymers that are commonly used as base layers in the manufacture of polymeric films. Preferably, the laminates of the invention may comprise a polymer such as an oriented polypropylene ("OPP"), oriented polyethylene terephthalate ("PET") or polyester, or a biaxially oriented nylon ("BON").

The film or laminate, with or without an adhesive layer, may then be used as an outer layer on a polymeric film such as a sealant film of a type that is common in the art of packaging. The polymeric sealant film may be either a single layer film or a multilayer film, and may be either a heat sealant film or a cold seal adhesive.

In an alternative embodiment of the package of the invention, the film or laminate of the invention may be used as an outer layer of a package having a three part structure. In this embodiment, the film or laminate of the invention may be adhered to a layer of foil, which is in turn adhered to a polymeric film. The polymeric film to which the foil is adhered may be a sealant film or coating, such as an extrusion coating. As in the first embodiment, the sealant film or coating may be either a single layer film or a multilayer film.

BRIEF DESCRIPTION OF THE DRAWINGS

FIG. 5 depicts a side view of a three-layer lamination of the first embodiment of the packaging material of the invention;

FIG. 6 depicts a side view of a seven-layer film of the first embodiment of the packaging material of the invention;

FIG. 7 depicts a side view of a five-layer film of the second embodiment of the packaging material of the invention;

FIG. 8 depicts a side view of a nine-layer film of the second embodiment of the packaging material of the invention;

FIG. 9 depicts a top view of a package made with the packaging material of the invention;

FIG. 10 depicts a top view of a package made with the packaging material of the invention; and FIG. 11 depicts a top view of a gussetted package made with the packaging material of the invention.

DETAILED DESCRIPTION OF THE INVENTION

Figure 1:
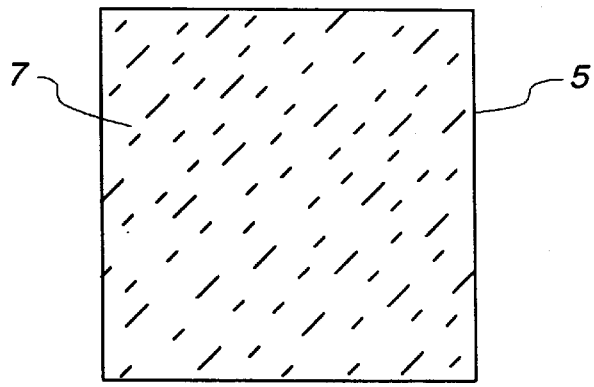
FIG. 1 depicts a top view of the film of the invention.

FIG. 1 depicts a top view of a flat sheet of polymeric material 5 of the laminate of the invention. Sheet 5 may comprise any of various polymeric materials commonly used as base layers in the art of making films. In a preferred embodiment of the laminate, sheet 5 comprises an oriented polypropylene ("OPP"), an oriented polyethylene terephthalate ("PET"), or a biaxially oriented nylon ("BON").

Oriented polypropylene or OPP refers to polypropylene, including copolymers of polypropylene, which have been stretched or oriented. Examples of OPP films that may be used in the laminate of the invention are T-523 or B-523, manufactured by Hercules Chemical Co.

In orientation, polymeric material is heated to its orientation temperature range and then cooled in order to freeze the molecular alignment of the material in the direction of stretching. Orientation temperature ranges for a particular film will vary with the different resinous thermoplastic materials or blends thereof which comprise the film. These temperature ranges are generally above room temperature and below the melting point of the thermoplastic material or blend of materials. Such ranges are well known to those skilled in the art. Uniaxial orientation results from a stretching force applied in one direction. Biaxial orientation results from a stretching force applied in two directions.

Biaxially oriented nylon or BON refers to any of the various polyamide or nylon copolymers typically used in the art of making polymeric films, such as nylon 6, nylon 6,6, nylon 6,10, nylon 11, nylon 12, nylon 6,12, amorphous nylons, partially aromatic polyamides, and copolymers of nylon. BON has been oriented in two directions, commonly called the machine and transverse directions.

Polyethylene terephthalate or PET includes copolymers of PET, and also includes oriented PET. Typically, oriented PET has good properties of strength, toughness and clarity. Examples of the PET films that may be used in the films of the inventions are films Hostophan 2600 and 2400, manufactured by Hoechst Celanese Chemical Co., and the resins LB, LB-1 and LB-7, manufactured by E.I. du Pont & de Nemours, Inc. and SKC-SP65 and SP91, manufactured by Kolon Chemical Company of Korea.

Depicted in FIG. 1 on sheet 5 is a plurality of minute cuts or nicks 7 that are located over substantially the entire surface area of sheet 5 to create the easy-opening feature of the invention.

Sheet 5 may be of a range of thicknesses that are common for base polymeric films, for example from 32 to 250 gauge. For general packaging applications, a preferred range of thickness for base layer 5 is 32 to 100 gauge. In the packaging of candy or similar products, with a cold seal adhesive, a preferred range of thickness for base layer 5 is from 125 to 175 gauge.

Sheet 5 may contain any of a variety of additives that are commonly used in polymeric films, such as slip agents, coatings or coloring agents. Sheet 5 may also be subjected to printing prior to creating the easy-opening feature of the invention. Printing of the base film sheet 5 can be done by any of the methods that are commonly used in the art of packaging for printing polymeric films. For example, the printing can be relief printing, lithographic or offset lithographic printing, intaglio printing, which is also called gravure or rotogravure, porous printing, impactless printing, or flexographic printing.

Figure 2:
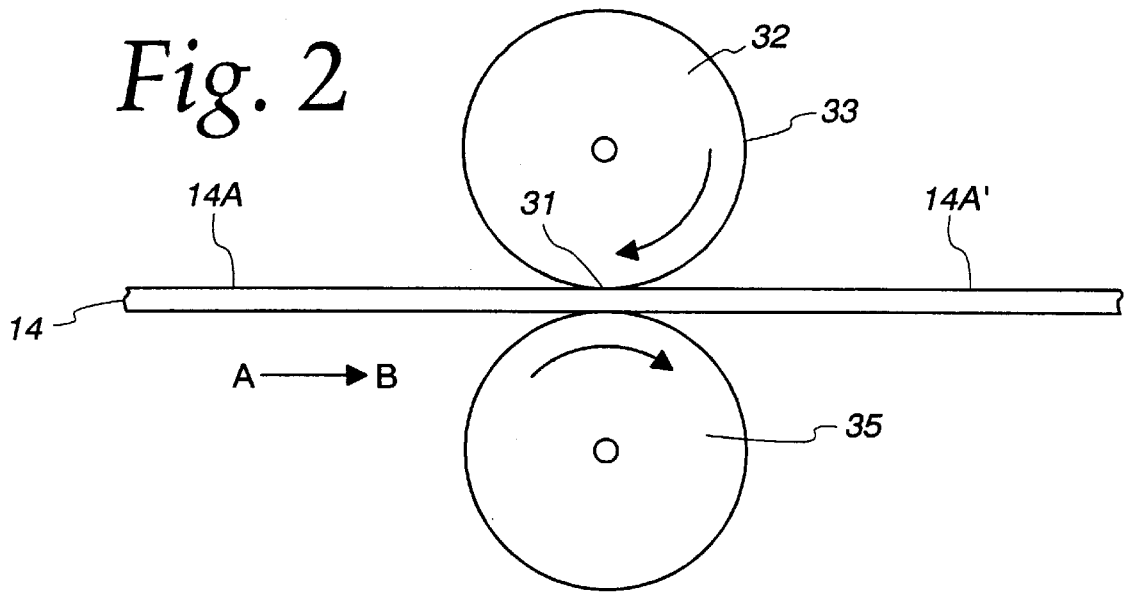
FIG. 2 depicts a method of imparting the easy-opening feature of the invention to the laminate.
Figure 3:
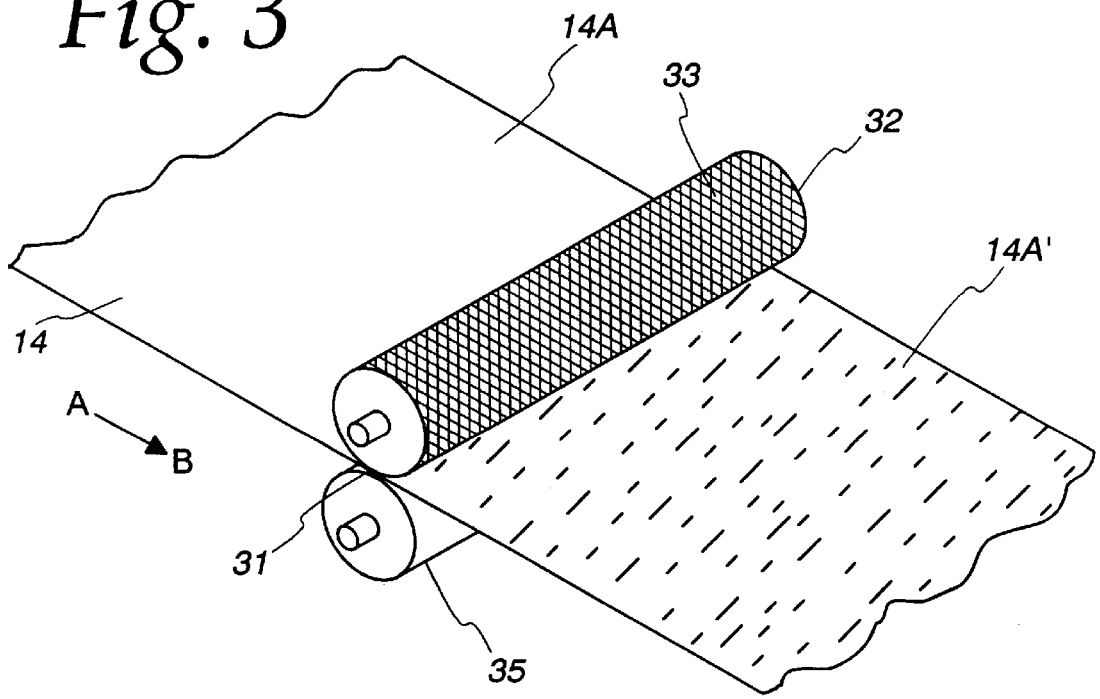
FIG. 3 depicts a method of imparting the easy-opening feature of the invention to the laminate.
Figure 4:
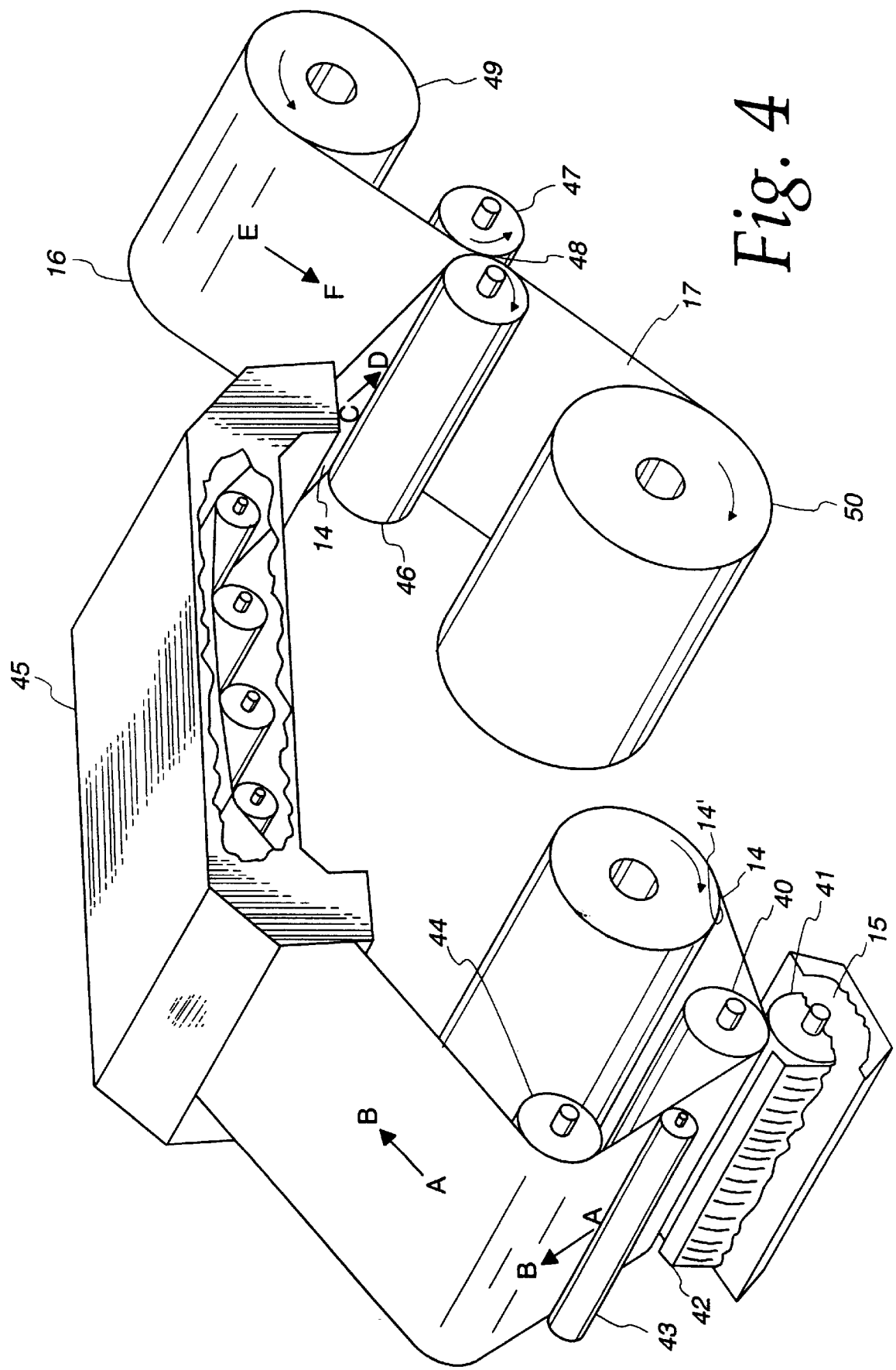
FIG. 4 depicts a method of making a three-layer lamination of the first embodiment of the invention.

FIGS. 2 through 4 depict various steps in the manufacture of the laminates of the invention and the further processing involved in manufacturing the packaging material and packages of the invention.

FIG. 2 shows a side view of a method of imparting the easy-opening feature of the invention to a film.

In FIG. 2, film 14 is a layer of a polymer such as an OPP, PET, BON, or copolymers thereof. Film 14 is disposed in the manner shown so that surface 14A faces up.

Film 14 is advanced in the direction along arrows A to B by any of the methods commonly used for advancing films during processing, for example through the use of rollers. Film 14 may have previously been subjected to printing. At point 31, surface 14A of film 14 comes into contact with nips of roller 32 and impression roller 35. Roller 32 rotates about its axis in a counterclockwise direction. Roller 35 rotates about its axis in a clockwise direction, and serves to press film 14 against roller 32. Roller 32 has a surface 33 which imparts a roughening or knurling effect to the surface 14A of film 14. Surface 33 may contain a wire structure, bristles as in a brush, a grindstone, a grainy substance, or other similar structure which roughens the surface 14A of film 14 to produce the roughened surface 14A'. As roller 32 rotates and surface 33 comes into contact with surface 14A of film 14, roller 32 produces a roughening or knurling over substantially the entire area of surface 14A of film 14.

Alternatively, a multilayer film consisting of a first layer of a base polymer, such as an OPP, PET or BON and a second layer of a coating or sealant film, may be coextruded. The multilayer film may have a layer of an adhesive disposed between the layer of a base polymer and the layer of a coating or sealant. The outer surface of the layer of base polymer may then be subjected to surface roughening of the easy-opening feature of the invention, as depicted in FIG. 2.

FIG. 3 depicts a side view of the processing of the film as shown in FIG. 2. FIG. 3 shows film 14 with surface 14A, advancing in the direction shown by arrows A to B. At point 31, the roller 32 comes into contact with surface 14A, producing the film of the invention with a roughened or knurled surface depicted as 14A'. The surface 33 of roller 32 had a structure or construction that roughens surface 14A of film 14.

The film of the invention may be further processed by any of the various methods common in the art of making multilayer polymeric films to produce the packaging materials of the invention.

The film of the invention, after having been subjected to roughening or knurling over substantially the entire surface area of the film, may then be laminated to a single layer or multilayer polymeric sealant film through use of adhesive lamination or extrusion lamination.

The lamination may be done by any of the various methods of lamination common in the art of making polymeric films, for example by adhesive lamination as shown in FIG. 4.

In FIG. 4, film 14, containing knurled surface 14' as described in FIGS. 2 and 3, is pulled up between the nips of roller 40, which turns upon its axis in a clockwise direction, and 41, which turns upon its axis in a counterclockwise direction, in the direction of arrows A to B. Roller 41 imparts a layer of an adhesive resin 15 to the side of film 14 opposite of knurled surface 14'. The adhesive is applied to the film 14 by the method of rotogravure. Thin steel blade 42 acts as a squeegee to remove excess adhesive resin 15 from film 14. Film 14 is then pulled along rollers 43 and 44 and advanced into dryer 45, which acts to dry film 14 and evaporate the solvent from the solvent-based adhesive resin 15.

After drying, film 14 is pulled by combiner nips 46 and 47, and advanced in the direction of arrows C to D. Sealant film 16 is pulled down from roller 49 in the direction of the arrows E to F. At point 48, between nips of roller 46, which turns in a clockwise direction, and 47, which turns in a counter-clockwise direction, the adhesive resin 15 comes into contact with sealant film 16. Sealant film 16 may be a single layer sealant film or a multilayer sealant film. The adhesive acts to adhere film 14 to sealant film 16. The completed film 17, having a structure of in order a knurled surface/adhesive/sealant film, is then rewound onto rewind roller 50.

In an alternative method of adhesive lamination, a solventless adhesive is used. With a solventless adhesive, the adhesive resin is applied to film 14 by the method of multi-roll transfer. The solventless adhesive method does not require the use of the dryer 45.

In an example of the second embodiment of the invention, film 16 may be a layer of a foil, such as any of the various foils typically used in flexible packaging producing an interim film, having a structure of knurled film/adhesive/foil. The interim film is then run through a second adhesive laminator in the place of film 14. An adhesive is added to the interim film on the foil, and a sealant film is then adhered to the foil layer of the interim film.

In addition to the adhesive lamination method depicted in FIG. 4, the films of the invention, both in their first and second embodiments, can be produced through other methods of adhesive lamination or through any of the methods of extrusion lamination that are common in the art of making polymeric films.

In either the first or second embodiments, the sealant film may be adhered to the knurled film or to the layer of foil, as a coating, such as an extrusion coating. Extrusion coating is a process through which an extruder forces a molten thermoplastic material through a horizontal slot die onto a moving web of material. The rate of application controls the thickness of the film deposited. The melt stream can be extruded in one or several layers.

FIGS. 5 through 8 all depict examples of various packaging materials of the invention. FIGS. 5 and 6 are side views of alternative structures of the first embodiment of the packaging materials of the invention. FIGS. 7 and 8 are side views of alternative structures of the second embodiment of the packaging materials of the invention.

In FIG. 5, film 70 is a laminate of the invention. Layer 71 may be any of various polymers or copolymers that are commonly used in the art, and preferably comprises OPP, PET, BON, or copolymers thereof. Layer 71 may have a range of thickness from approximately 32 gauge up to approximately 100 gauge. The surface 71A of layer 71 contains the easy-opening feature of the invention. Substantially the entire surface area of surface 71A is roughened or knurled by the application of a series of small nicks or minute cuts in the laminate.

Layer 72 is a layer of an adhesive, and may comprise any of the various polymeric adhesives commonly used in the art. The invention contemplates use of both solvent-based adhesives and adhesives not requiring a solvent. The adhesive may be a rubber-based adhesive or a thermoplastic hot melt adhesive. Typically, polymeric adhesives are used in a thickness of approximately 0.1 mil for adhesive laminating, 0.4 to 2.0 mil for extrusion laminating.

Disposed in surface-to-surface contact with layer 72 is film 73, a single layer sealant film. Layer 73 may comprise any of the various heat sealable polymers or copolymers that are commonly used in the art. Layer 73 may be within the range of thicknesses of from 50 gauge up to 4 mils, and is preferably from 1 to 3 mils.

Heat sealable, as used herein, means sealable or bondable by heat however obtained, for example, by induction or magnetic, ultrasonic, radio frequency, light, laser, resistance heating or other energy sources which cause the materials to bond, fuse or otherwise seal. Such heat sealable materials usually are thermoplastic film forming polymers, are well known in the art, and include ethylene polymers and copolymers, and copolymers of ethylene and an ethylenically unsaturated comonomer selected from the group consisting of carboxylic acids and esters, salts and anhydrides thereof. Layer 73 may comprise any of the various polymers used in sealant layers, such as LLDPE, including all linear polyethylenes with a density up to about 0.95 g/cc, LDPE, EVA, medium density polyethylene ("MDPE"), olefins catalyzed by a single site catalyst, EMA, EMAA, an ionomer, or a blend of any of these polymers, or heat seal coatings.

The invention also contemplates use of a cold seal adhesive.

FIG. 6 depicts an alternative, preferred embodiment of the packaging material of the invention, in which the laminate 70 of FIG. 6, with knurled surface 71A, is adhered to a multilayer sealant film, for example a five layer coextruded film.

Disposed in surface to surface contact with layer 72 of the laminate 70 is the layer 75 of multilayer sealant film 74. Layer 75 of film 74 may be any of various polymers that are common in the art for use in abuse-resistant layers, such as high density polyethylene ("HDPE") or medium density polyethylene ("MDPE").

Disposed in contact with layer 75 is layer 76 of an adhesive. Layer 76 serves to adhere layer 75 to 77, which is an oxygen barrier layer that may comprise any of the various polymers commonly used in barrier layers, such as for example EVOH. Layer 78 is a second adhesive layer, which is disposed in contact with layer 77. Layer 78 serves to adhere layer 77 to layer 79, which is a sealant layer that comprises a heat sealable polymer. The multilayer sealant may have a wide range of thicknesses, from 50 gauge up to 4 mils and is preferably from 1 to 3 mils.

FIGS. 7 and 8 depict the laminate of the invention in additional alternative embodiments of the packaging material of the invention. In this second embodiment, the film contains a layer of aluminum foil.

Multilayer thermoplastic films containing foil layers, especially aluminum foil, are common in the art. However, prior art films having structures of OPP/foil/sealant do not tear easily, and generally require the use of cutting aids, such as scissors, to open. The OPP/foil/sealant films of the invention, however, having an OPP layer that is knurled over substantially its entire surface areas, tear easily.

Aluminum foil is a thin rolled sheet of pure or alloyed aluminum, and is known as a versatile material that can be easily laminated to polymeric materials. Aluminum foil is odorless, and has favorable properties as a water vapor barrier and as a gas barrier. Suitable aluminum foils are those manufactured by Aluminum Company of America (Alcoa), Alumax, Inc. and Norandol U.S.A., Inc.

In FIG. 7, adhesive layer 72 of laminate 70 is disposed in surface-to-surface contact with layer 81, which comprises foil. The foil may comprise any of the foils commonly used in flexible packaging, such as aluminum foil alloys 1100 or 1145. The foil may be used in the thickness range of from 0.00025 inch to 0.001 inch.

Disposed in surface-to-surface contact with layer 81 is adhesive layer 82. Adhesive layer 82 serves to adhere layer 81 to layer 83. Layer 83 is a single layer sealant film which comprises a heat sealable polymer. Layer 83 may be of a thickness within the range of from 50 gauge up to 4 mils, and is preferably from 1 to 3 mils.

The laminate of the invention may alternatively be adhered to a multilayer sealant film having four, five, six or more layers. FIG. 8 depicts the film of the invention with a five layer sealant film.

In FIG. 8, layer 91 is a layer of a foil. Disposed in surface to surface contact with layer 91 is adhesive layer 97. Adhesive layer 97 serves to adhere layer 91 to the five layer sealant film 98.

Sealant film 98 has a layer 92 which comprises any of the polymers commonly used in abuse-resistant layers, such as HDPE or MDPE. Disposed in surface to surface contact with layer 92 is adhesive layer 93. Adhesive layer 93 serves to adhere layer 92 to layer 94. Layer 94 may comprise any of the various barrier layers commonly used in polymeric films, such as for example EVOH. Layer 95 is a second layer of an adhesive, and serves to adhere layer 94 to layer 96. Layer 96 is a heat sealable polymer which comprises any of the various heat sealable polymers that are commonly used in the art. Layer 96 may be of a thickness within the range of from 50 gauge up to 4 mils, and is preferably from 1 to 3 mils.

FIG. 9 depicts a package or a pouch 100 made from a multilayer polymeric film or packaging material in which the laminate of the invention is used as an outer layer 104. Pouch 100 is sealed at its sides 101, 102 and 103 by heat seal or other sealant mechanisms commonly used in the art of making polymeric films.

Side 104, which is not sealed as depicted in FIG. 2, may be sealed in an alternative embodiment of the pouch. Layer 105 has a plurality of minute nicks or cuts 106 located over substantially the entire surface area of layer 105, including those areas where the pouch 100 has been sealed.

FIG. 10 depicts package 110, an additional embodiment of a package or pouch made from a packaging material of the invention. Package 110 is sealed at the top side 111 with a top seal 112 and is also sealed at the bottom side 113 with a bottom seal 114, and along a line 115A to 115B called the back of the pouch, with a back seal 115. The laminate of the invention 116 is used as an outer layer for package 110. Depicted in layer 116 are the minute cuts or nicks 117 located over substantially the entire surface area of layer 116, including those areas where the package 110 has been sealed.

A particular application of the film is in the production or use of gusseted bags, as depicted in FIG. 11 of gussetted bag 120. Gussetted sides 121, 122, 123 and 124 are not sealed, but rather are continuous layers of polymeric material. Depicted at 125 is a back seal or fin seal, or seal in which the sealant layer of the package is folded over onto itself.

Outer layer 126 includes a laminate that has been subjected to the nicks or minute cuts described in this application as a method of creating an easy opening feature.

As depicted in FIG. 11, a consumer who wants to open gussetted package 120 will be easily able to obtain access to the product. Because of the method of the invention which produces nicks or minute cuts located on the laminate 126 used as the outer layer of bag 120, the consumer will be able to tear through the package at any point along gussetted sides 121, 122, 123 or 124.

EXAMPLES

Samples of the films of the invention were constructed and made into easy-opening pouches having a tear feature as herein described. The samples were constructed into gussetted and non-gussetted bags.

Example 1

A bag was constructed of a film having a layer structure of OPP/adhesive/sealant film. The OPP layer, which was T-523 film manufactured by Hercules Chemical Company, was reverse printed with a promotional design. The film was then knurled, i.e., subjected to the nicks or minute cuts that are described in this application as a method for creating an easy-opening feature. The film of the invention was then adhesive laminated to a single layer 2 mil sealant film, which was a blend of EVA and LLDPE.

The completed packaging material film was found to have favorable physical properties. For example, the water vapor transmission rate ("WVTR") was measured for the packaging material of the invention and was compared to the WVTR of the sealant film itself. Over a 24 hour period at 100° F., the WVTR of the packaging material of the invention was 0.24 g/100 in.$^2$. The lack of a significant change in the WVTR with the addition of the laminate of the invention shows that the roughening or knurling of the entire surface area of the invention has little to no negative effect on the barrier properties of the film.

The resulting film was made into pouches which were each 5 inches high and four inches wide. The pouches were sealed with a top seal and two side seals. The pouches were found to have favorable physical properties, and were easily torn open at any point.

Examples of packages of the films of the invention having a layer of foil or metallized PET were also produced. The following are examples of the second embodiment of the invention:

Example 2

Example 2 had a first layer of 75 gauge OPP Hercules T-523 film. The OPP film, which was not printed, was knurled over substantially its entire surface. The OPP layer was then adhesive laminated to a layer of 0.000285 inch foil, and the foil layer was in turn adhesive laminated to a 1 mil sealant film of LDPE.

The resulting film was made into pouches that were 4 inches high by 2½ inches wide. The pouches had favorable physical properties, and were easily opened at any point.

Example 3

Example 3 had a first layer of 48 gauge PET film, American Hoechst Hostaphan 2600. The PET film was adhesive laminated to a layer of 0.000285 inch foil, and the foil layer was in turn adhesive laminated to a 1 mil sealant film of LDPE.

The resulting film was made into pouches that were 4 inches high by 2½ inches wide. The pouches had favorable physical properties, and were opened easily at any point.

The foregoing examples are representative of bags that may be constructed using the laminate of the invention. These examples are not intended to cover the only structures that may be made, nor are they intended to cover the only structures that may be made, nor are intended to limit the terms of the invention.

Having thus described the invention, what is claimed is:

1. A multilayer polymeric packaging material, comprising:
   (a) a first layer, constituting the outer layer of said packaging material having first and second surfaces, said first surface being roughened over substantially the entire surface area of said first surface;
   (b) a second layer of a polymeric adhesive, said second layer having first and second surfaces, said first surface of said second layer disposed in surface-to-surface contact with said second surface of said first layer;
   (c) a third layer of a foil, said third layer having first and second surfaces, said first surface of said third layer disposed in contact with said second surface of said second layer;
   (d) a fourth layer of a polymeric adhesive, said fourth layer having first and second surfaces, said first surface of said fourth layer disposed in contact with said second surface of said third layer; and
   (e) a fifth layer of a polymeric sealant film, said fifth layer having first and second surfaces, said first surface of said fifth layer disposed in contact with said second surface of said fourth layer.

2. A multilayer polymeric packaging material as in claim 1, wherein said fifth layer of a polymeric sealant film is a multilayer sealant film.

3. A multilayer polymeric packaging material as in claim 2, wherein said multilayer sealant film is a five layer film having the following layer structure in order: a layer comprising a polymer selected from the group consisting of HDPE and MDPE; a layer comprising an adhesive; a layer comprising EVOH; a layer comprising an adhesive; and a layer comprising a heat sealable polymer wherein said layer comprising a polymer selected from the group consisting of HDPE and MDPE is disposed in surface-to-surface contact with said second surface of said fourth layer of said polymeric adhesive.

4. A multilayer polymeric packaging material comprising:
   (a) a first layer, constituting the outer layer of said packaging material, having first and second surfaces, said first surface being roughened over substantially the entire surface area of said first surface;
   (b) a second layer of a polymeric adhesive, said second layer having first and second surfaces, said first surface of said second layer disposed in surface-to-surface contact with said second surface of said first layer; and
   (c) a third layer of a polymeric sealant film wherein said third layer of polymeric sealant film is a multilayer sealant film having five layers consisting of the following structure in order: a layer comprising a polymer selected from the group consisting of HDPE and MDPE; a layer comprising an adhesive; a layer comprising a polymer selected from the group consisting of EVOH and nylon; a layer comprising an adhesive; and a layer comprising a heat sealable polymer, wherein said layer comprising a polymer selected from the group consisting of HDPE and MDPE is disposed in surface-to-surface contact with said second surface of said second layer of said polymeric adhesive.

* * * * *